(12) United States Patent
Jiang (10) Patent No.: US 12,086,394 B2
(45) Date of Patent: Sep. 10, 2024

(54) IMAGE PROCESSING COMPONENT AND IMAGE PROCESSING METHOD FOR EDITING OPERATIONS, AND ELECTRONIC DEVICE AND STORAGE MEDIUM

(71) Applicant: BEIJING BYTEDANCE NETWORK TECHNOLOGY CO., LTD., Beijing (CN)

(72) Inventor: Ruyu Jiang, Beijing (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 0 days.

(21) Appl. No.: 17/877,924

(22) Filed: Jul. 30, 2022

(65) Prior Publication Data

US 2022/0365664 A1    Nov. 17, 2022

Related U.S. Application Data (63) Continuation of application No. PCT/CN2021/076693, filed on Feb. 18, 2021.

(30) Foreign Application Priority Data

Feb. 24, 2020  (CN) .......................... 202010112866.7

(51) Int. Cl.
*G06F 3/04886* (2022.01)
*G06F 3/04845* (2022.01)

(52) U.S. Cl.
CPC ...... *G06F 3/04845* (2013.01); *G06F 3/04886* (2013.01); *G06F 2203/04803* (2013.01)

(58) Field of Classification Search
None
See application file for complete search history.

(56) References Cited

U.S. PATENT DOCUMENTS

| 2011/0185297 A1 | 7/2011 | Reid et al. |
| 2013/0235076 A1 | 9/2013 | Cherna et al. |
| 2016/0295104 A1 | 10/2016 | An et al. |

FOREIGN PATENT DOCUMENTS

| CN | 104461280 A | 3/2015 |
| CN | 105700789 A | 6/2016 |

(Continued)

OTHER PUBLICATIONS

"How To Use Photoshop Express To Create Stunning iPhone Photo Edits" (Posted by David Martin in 2016) https://iphonephotographyschool.com/photoshop-express/#disqus_thread.*

(Continued)

*Primary Examiner* — Rinna Yi (57) ABSTRACT

An image processing component includes: a display control configured to display a to-be-edited image on a first area in a display area or display a target image after performing an adjustment operation on the to-be-edited image; an image scale adjustment control configured to display, in response to a first control instruction, an image scale adjustment interface on an area in the display area other than the first area, and display a scale touch area and a first overlay function touch area in the image scale adjustment interface; and an image rotation control configured to display, in response to a second control instruction, an image rotation adjustment interface on an area in the display area other than the first area, and display a rotation touch area and a second overlay function touch area in the image rotation adjustment interface.

15 Claims, 3 Drawing Sheets

(56) References Cited

FOREIGN PATENT DOCUMENTS

| | | |
|---|---|---|
| CN | 105849685 A | 8/2016 |
| CN | 105892869 A | 8/2016 |
| CN | 106406741 A | 2/2017 |
| CN | 107369197 A | 11/2017 |
| CN | 107526505 A | 12/2017 |
| CN | 108132749 A | 6/2018 |
| CN | 108765519 A | 11/2018 |
| CN | 108898545 A | 11/2018 |
| CN | 108958608 A | 12/2018 |
| CN | 111352557 A | 6/2020 |
| JP | 2011170574 A | 9/2011 |
| WO | 2017110505 A1 | 6/2017 |

OTHER PUBLICATIONS

"Adobe Photoshop Express Full Tutorial—Photoshop Mobile Tutorial" https://www.youtube.com/watch?v=tihF1sKe-1s published on Jun. 27, 2019 by MK (Year: 2019).*

International Search Report issued May 10, 2022 in International Patent Application No. PCT/CN2021/076693.

Extended European Search Report and Search Opinion issued May 31, 2023 in European Application No. 21760494.1 (9 pages).

\* cited by examiner

IMAGE PROCESSING COMPONENT AND IMAGE PROCESSING METHOD FOR EDITING OPERATIONS, AND ELECTRONIC DEVICE AND STORAGE MEDIUM

CROSS REFERENCE TO RELATED APPLICATION

The present application is a continuation of International Patent Application No. PCT/CN2021/076693, filed on Feb. 18, 2021, which claims priority to Chinese Patent Application No. 202010112866.7, titled "IMAGE PROCESSING METHOD AND ASSEMBLY, ELECTRONIC DEVICE AND STORAGE MEDIUM", filed on Feb. 24, 2020, both of which are incorporated herein by reference in their entireties.

TECHNICAL FIELD

The present disclosure relates to image processing technology, in particular to an image processing method, an image processing component, an electronic devices and a storage medium.

BACKGROUND

Basic functions of composition in existing image processing software are usually paginated according to different categories. For example, a scale adjustment function corresponds to a scale adjustment interface, the scale adjustment interface displays only a key for the scale adjustment function. A drag and crop function corresponds to a cropping interface, the cropping interface only displays a cropping frame used for cropping an image to be processed. However, one composition may require repeated operations of multiple function combinations, at this time, the user needs to switch between multiple categories of interfaces to complete the composition. Apparently, the operation is cumbersome and a user experience is poor.

SUMMARY

In order to solve the above problems, an image processing method, an image processing component, an electronic devices and a storage medium are provided according to the disclosure, which can avoid cumbersome operations such as a user switching back and forth between multiple functional interfaces in one composition, thereby laying a foundation for improving composition efficiency and user experience.

In a first aspect, an image processing component is provided. The image processing component displays at least following controls on a display area after an electronic device starts an image processing program. The controls include: a display control configured to display a to-be-edited image on a first area in the display area or display a target image obtained after performing an adjustment operation on the to-be-edited image, where the adjustment operation includes at least a scale adjustment operation and a rotation operation; an image scale adjustment control configured to display, in response to a first control instruction, an image scale adjustment interface on an area in the display area other than the first area, and at least display a scale touch area and a first overlay function touch area in the image scale adjustment interface, where the scale touch area is used for responding to the scale adjustment operation on the to-be-edited image, and the first overlay function touch area is used for responding to an adjustment operation on the to-be-edited image other than the scale adjustment operation; and an image rotation control configured to display, in response to a second control instruction, an image rotation adjustment interface on an area in the display area other than the first area, and at least display a rotation touch area and a second overlay function touch area in the image rotation adjustment interface, where the rotation touch area is used for responding to the rotation operation on the to-be-edited image, and the second overlay function touch area is used for responding to an adjustment operation on the to-be-edited image other than the rotation operation.

Here, the image scale adjustment interface corresponding to the image scale adjustment control is provided with the scale touch area matching the image scale adjustment control and the first overlay function touch area for responding to another adjustment operation, the image rotation adjustment interface corresponding to the image rotation control is provided with the rotation touch area matching the image rotation control and the second overlay function touch area for responding to another adjustment operation, that is, the image scale adjustment control and the image rotation control used for the composition operation in the embodiment of the present disclosure not only have their respective corresponding control functions, but also have other functions. In this way, it is possible for the user to realize multiple composition functions in one interface, and avoid cumbersome operations such as the user switching back and forth between multiple functional interfaces in one composition to the greatest extent, which lays a foundation for improving composition efficiency and user experience.

In one embodiment, the display control is further configured to display a cropping frame used for responding to a cropping operation on the to-be-edited image, crop the to-be-edited image in response to the cropping operation for the cropping frame, and at least display a target image obtained after cropping the to-be-edited image in the cropping frame.

Here, the display control is provided with the cropping frame used for responding to the cropping operation on the to-be-edited image, therefore, the cropping frame can be displayed by using the display control no matter in the image scale adjustment interface or the image rotation adjustment interface, and further, the image scale adjustment control and the image rotation control have the cropping function without the need for interface switching, which further avoids cumbersome operations, and lays a foundation for improving composition efficiency and user experience.

In one embodiment, the display control is further configured to, in response to a first touch operation on the first area and after determining that a first operation feature of the first touch operation meets a preset rule, perform a perspective operation on the to-be-edited image or the target image currently displayed on the first area based on the first operation feature, and display a target image obtained after the perspective operation on the first area.

Here, the display control can perform the perspective operation on the to-be-edited image or the target image in response to the first touch operation having the operation feature meeting the preset rule, therefore, the perspective operation can be realized by using the display control no matter in the image scale adjustment interface or the image rotation adjustment interface, so that the image scale adjustment control and the image rotation control have the perspective function without the need for interface switching, which further avoids cumbersome operations, and lays a foundation for improving composition efficiency and user experience.

In one embodiment, the display control is further configured to obtain an operation feature of the first touch operation in a preset first direction and/or a preset second direction, and perform a perspective operation on the to-be-edited image or the target image currently displayed in the first area based on the operation feature of the first touch operation in the preset first direction and/or the preset second direction.

In one embodiment, the image processing component further displays at least an image perspective control on the display area after the electronic device starts the image processing program. The image perspective control is configured to display, in response to a third control instruction, an image perspective adjustment interface on an area in the display area other than the first area, and at least display a perspective touch area and a third overlay function touch area in the image perspective adjustment interface, where the perspective touch area is used for responding to a perspective operation on the to-be-edited image, and the third overlay function touch area is used for responding to an adjustment operation on the to-be-edited image other than the perspective operation.

Here, the image processing component further displays the image perspective control on the display area after the electronic device starts the image processing program, therefore, user composition tools are enriched and the foundation is laid for improving the user experience. Moreover, the image perspective adjustment interface corresponding to the image perspective control is provided with the perspective touch area matching the image perspective control and the third overlay function touch area used for responding to another adjustment operation, that is, the image perspective control used for the composition operation in the embodiment of the present disclosure not only has the perspective function, but also has other functions, which further avoids cumbersome operations, and lays a foundation for improving composition efficiency and user experience.

In one embodiment, the perspective touch area includes: a first sub-area used for performing the perspective operation on the to-be-edited image in a preset first direction, in response to a second touch operation on the first sub-area and based on a second operation feature of the second touch operation in the preset first direction; and/or a second sub-area used for performing the perspective operation on the to-be-edited image in a preset second direction, in response to a third touch operation on the second sub-area and based on a third operation feature of the third touch operation in the preset second direction.

Here, two sub-areas in different directions are provided in the perspective touch area in the embodiment of the present disclosure, thereby enriching perspective manners and laying a foundation for improving user experience.

In one embodiment, the third overlay function touch area at least includes a scale touch sub-area used for responding to the scale adjustment operation on the to-be-edited image.

In one embodiment, the first overlay function touch area includes at least one of the following touch sub-areas: a rotation touch sub-area used for responding to the rotation operation on the to-be-edited image; and a perspective touch sub-area used for responding to the perspective operation on the to-be-edited image.

In one embodiment, the second overlay function touch area includes at least one of the following touch sub-areas: a scale touch sub-area used for responding to the scale adjustment operation on the to-be-edited image; and a perspective touch sub-area used for responding to the perspective operation on the to-be-edited image.

In a second aspect, an electronic device is provided according to an embodiment of the present disclosure. The electronic device at least includes: a storage component for storing an image; and an image processing component connected to the storage component. The image processing component is the above-mentioned image processing component.

In a third aspect, an image processing method is provided according to the embodiment of the disclosure. A first area in a display area of an electronic device displays a to-be-edited image or displays a target image obtained after performing an adjustment operation on the to-be-edited image. The method includes: performing, in response to an adjustment operation on a first overlay function touch area in an image scale adjustment interface, an adjustment operation on the to-be-edited image other than a scale adjustment operation, where the image scale adjustment interface is displayed on an area in the display area other than the first area, and the image scale adjustment interface at least displays a scale touch area and a first overlay function touch area, where the scale touch area is used for responding to a scale adjustment operation on the to-be-edited image, and the first overlay function touch area is used for responding to an adjustment operation on the to-be-edited image other than the scale adjustment operation; and/or performing, in response to an adjustment operation on a second overlay function touch area in an image rotation adjustment interface, an adjustment operation on the to-be-edited image other than a rotation operation, where the image rotation adjustment interface is displayed on an area in the display area other than the first area, and the image rotation adjustment interface at least displays a rotation touch area and a second overlay function touch area, where the rotation touch area is used for responding to a rotation operation on the to-be-edited image, and the second overlay function touch area is used for responding to an adjustment operation on the to-be-edited image other than the rotation operation.

In one embodiment, the method further includes: cropping the to-be-edited image in response to a cropping operation for a cropping frame; at least displaying a target image obtained after cropping the to-be-edited image in the cropping frame. The cropping frame is displayed on the first area and surrounds at least a part of the area of the to-be-edited image, to crop the to-be-edited image based on change in the area enclosed by the cropping frame.

In one embodiment, the method further includes: in response to a first touch operation on the first area and after determining that a first operation feature of the first touch operation meets a preset rule, performing a perspective operation on the to-be-edited image or the target image currently displayed on the first area based on the first operation feature, and displaying a target image obtained after the perspective operation on the first area.

In one embodiment, the performing a perspective operation on the to-be-edited image or the target image currently displayed on the first area based on the first operation feature includes: obtaining an operation feature of the first touch operation in a preset first direction and/or a preset second direction, and performing a perspective operation on the to-be-edited image or the target image currently displayed in the first area based on the operation feature of the first touch operation in the preset first direction and/or the preset second direction.

In one embodiment, the method further includes: performing, in response to an adjustment operation on a third overlay function touch area in an image perspective adjustment interface, an adjustment operation on the to-be-edited image other than a perspective operation, where the image perspective adjustment interface is displayed on an area in the display area other than the first area, and the image perspective adjustment interface at least displays a perspective touch area and a third overlay function touch area, where the perspective touch area is used for responding to a perspective operation on the to-be-edited image, and the third overlay function touch area is used for responding to an adjustment operation on the to-be-edited image other than the perspective operation.

In one embodiment, the method further includes: performing the perspective operation on the to-be-edited image in a preset first direction, in response to a second touch operation on a first sub-area in the perspective touch area and based on a second operation feature of the second touch operation in the preset first direction; and/or performing the perspective operation on the to-be-edited image in a preset second direction, in response to a third touch operation on a second sub-area in the perspective touch area and based on a third operation feature of the third touch operation in the preset second direction.

In one embodiment, the method further includes: performing the scale adjustment operation on the to-be-edited image, in response to an adjustment operation on a scale touch sub-area at least included in the third overlay function touch area.

In one embodiment, the method further includes: performing the rotation operation on the to-be-edited image, in response to an adjustment operation on a rotation touch sub-area at least included in the first overlay function touch area; and/or performing a perspective operation on the to-be-edited image, in response to an adjustment operation on a perspective touch sub-area at least included in the first overlay function touch area.

In one embodiment, the method further includes: performing the scale adjustment operation on the to-be-edited image, in response to an adjustment operation on a scale touch sub-area at least included in the second overlay function touch area; and/or performing a perspective operation on the to-be-edited image, in response to an adjustment operation on a perspective touch sub-area at least included in the second overlay function touch area.

In a fourth aspect, an electronic device is provided according to an embodiment of the disclosure. The electronic device includes a display unit and a processing unit. The display unit is configured to display a to-be-edited image on a first area in the display area or display a target image obtained after performing an adjustment operation on the to-be-edited image. The processing unit is configured to: perform, in response to an adjustment operation on a first overlay function touch area in an image scale adjustment interface, an adjustment operation on the to-be-edited image other than a scale adjustment operation, where the image scale adjustment interface is displayed on an area in the display area other than the first area, and the image scale adjustment interface at least displays a scale touch area and a first overlay function touch area, where the scale touch area is used for responding to a scale adjustment operation on the to-be-edited image, and the first overlay function touch area is used for responding to an adjustment operation on the to-be-edited image other than the scale adjustment operation; and/or perform, in response to an adjustment operation on a second overlay function touch area in an image rotation adjustment interface, an adjustment operation on the to-be-edited image other than a rotation operation, where the image rotation adjustment interface is displayed on an area in the display area other than the first area, and the image rotation adjustment interface at least displays a rotation touch area and a second overlay function touch area, where the rotation touch area is used for responding to a rotation operation on the to-be-edited image, and the second overlay function touch area is used for responding to an adjustment operation on the to-be-edited image other than the rotation operation.

In one embodiment, the processing unit is further configured to: crop the to-be-edited image in response to a cropping operation for a cropping frame; at least display a target image obtained after cropping the to-be-edited image in the cropping frame. The cropping frame is displayed on the first area and surrounds at least a part of the area of the to-be-edited image, to crop the to-be-edited image based on change in the area enclosed by the cropping frame.

In one embodiment, the processing unit is further configured to: in response to a first touch operation on the first area and after determining that a first operation feature of the first touch operation meets a preset rule, perform a perspective operation on the to-be-edited image or the target image currently displayed on the first area based on the first operation feature, and display a target image obtained after the perspective operation on the first area.

In one embodiment, the processing unit is further configured to: obtain an operation feature of the first touch operation in a preset first direction and/or a preset second direction, and perform a perspective operation on the to-be-edited image or the target image currently displayed in the first area based on the operation feature of the first touch operation in the preset first direction and/or the preset second direction.

In one embodiment, the processing unit is further configured to: perform, in response to an adjustment operation on a third overlay function touch area in an image perspective adjustment interface, an adjustment operation on the to-be-edited image other than a perspective operation, where the image perspective adjustment interface is displayed on an area in the display area other than the first area, and the image perspective adjustment interface at least displays a perspective touch area and a third overlay function touch area, where the perspective touch area is used for responding to a perspective operation on the to-be-edited image, and the third overlay function touch area is used for responding to an adjustment operation on the to-be-edited image other than the perspective operation.

In one embodiment, the processing unit is further configured to: perform the perspective operation on the to-be-edited image in a preset first direction, in response to a second touch operation on a first sub-area in the perspective touch area and based on a second operation feature of the second touch operation in the preset first direction; and/or perform the perspective operation on the to-be-edited image in a preset second direction, in response to a third touch operation on a second sub-area in the perspective touch area and based on a third operation feature of the third touch operation in the preset second direction.

In one embodiment, the processing unit is further configured to: perform the scale adjustment operation on the to-be-edited image, in response to an adjustment operation on a scale touch sub-area at least included in the third overlay function touch area.

In one embodiment, the processing unit is further configured to: perform the rotation operation on the to-be-edited image, in response to an adjustment operation on a rotation touch sub-area at least included in the first overlay function touch area; and/or perform a perspective operation on the to-be-edited image, in response to an adjustment operation on a perspective touch sub-area at least included in the first overlay function touch area.

In one embodiment, the processing unit is further configured to: perform the scale adjustment operation on the to-be-edited image, in response to an adjustment operation on a scale touch sub-area at least included in the second overlay function touch area; and/or perform a perspective operation on the to-be-edited image, in response to an adjustment operation on a perspective touch sub-area at least included in the second overlay function touch area.

In a fifth aspect, an electronic device is provided according to the disclosure. The electronic device includes one or more processors, a memory communicatively connected to the one or more processors; and one or more programs. The one or more programs are stored in the memory and are configured to be executed by the one or more processors, to perform the above method.

In a sixth aspect, a computer-readable storage medium is provided according to the disclosure. The computer-readable storage medium stores a computer program. The computer program, when executed by a processor, performs the above method.

Here, the image scale adjustment interface corresponding to the image scale adjustment control is provided with the scale touch area matching the image scale adjustment control and the first overlay function touch area for responding to another adjustment operation, the image rotation adjustment interface corresponding to the image rotation control is provided with the rotation touch area matching the image rotation control and the second overlay function touch area for responding to another adjustment operation, that is, the image scale adjustment control and the image rotation control used for the composition operation in the embodiment of the present disclosure not only have their respective corresponding control functions, but also have other functions. In this way, it is possible for the user to realize multiple composition functions in one interface, and avoid cumbersome operations such as the user switching back and forth between multiple functional interfaces in one composition to the greatest extent, which lays a foundation for improving composition efficiency and user experience.

DETAILED DESCRIPTION OF THE EMBODIMENTS

In order to make the purpose, technical solutions and advantages of the present disclosure more clearly understood, the present disclosure will be described in further detail below with reference to the accompanying drawings and embodiments. It should be understood that the specific embodiments described herein are only used to explain the present disclosure, but not to limit the present disclosure.

Some processes described in the description, claims and the above figures of the present disclosure include multiple operations appearing in a specific order, it should be clearly understood that these processes may include more or less operations, and these operations may be performed sequentially or in parallel.

An image processing component is provided according to an embodiment of the present disclosure. The solution of the present disclosure is described in detail with reference to FIG. 1 to FIG. 5. Specifically, according to the disclosure, the image processing component displays at least following controls on a display area after an electronic device starts an image processing program. The controls include a display control, an image scale adjustment control and an image rotation control.

Figure 1:
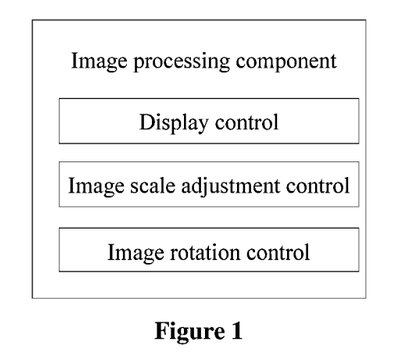
FIG. 1 is a schematic structural diagram of an image processing component according to an embodiment of the present disclosure.
Figure 2:
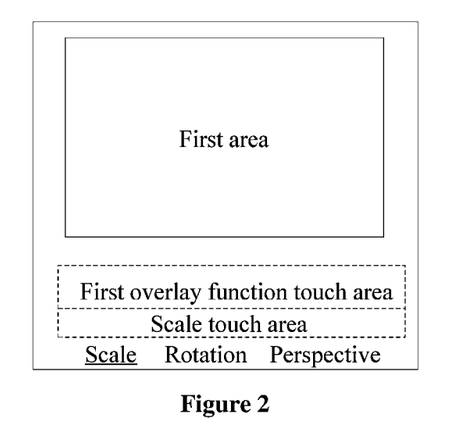
FIG. 2 is a schematic diagram of a first interface in a specific example of an image processing component according to an embodiment of the present disclosure.

The display control is configured to display a to-be-edited image on a first area in the display area or display a target image obtained after performing an adjustment operation on the to-be-edited image. The adjustment operation includes at least a scale adjustment operation and a rotation operation. For example, as shown in FIG. 2, when an electronic device, such as a mobile phone, starts the image processing program and enters an editing interface, at this time, the display control displays the to-be-edited image on the first area in the display area. The target image obtained after the adjustment operation on the to-be-edited image can also be displayed in real time on the first area, so that it is convenient for the user to view the real-time adjustment effect.

The image scale adjustment control is configured to display, in response to a first control instruction, an image scale adjustment interface on an area in the display area other than the first area, and at least display a scale touch area and a first overlay function touch area in the image scale adjustment interface, where the scale touch area is used for responding to the scale adjustment operation on the to-be-edited image, and the first overlay function touch area is used for responding to an adjustment operation (such as a rotation operation and/or a perspective operation) on the to-be-edited image other than the scale adjustment operation. For example, as shown in FIG. 2, when an electronic device, such as a mobile phone, starts the image processing program and enters an editing interface, an image scale adjustment interface can be directly displayed on an area in the display area other than the first area by default after entering the editing interface. The image scale adjustment interface includes a scale touch area and a first overlay function touch area. In this case, the first control instruction may be a trigger instruction that triggers entering the editing interface (for example, the mobile phone generates a trigger instruction according to a touch operation on an "edit" virtual key (not shown in the figure), to enter the editing interface).

Apparently, in practice, as shown in FIG. 2, the display area may also display a "scale" virtual key for the image scale adjustment control, a "rotation" virtual key for the image rotation control, etc. In this way, the user may switch between the image scale adjustment interface and the image rotation adjustment interface by clicking "Scale" or "Rotation", which is convenient for the user to perform a switch operation. In this case, the first control instruction for triggering entering the image scale adjustment interface may also be implemented as a case that the electronic device detects a touch operation performed on the "scale" virtual key, generates the first control instruction, and triggers entering the image scale adjustment interface.

In one embodiment, the first overlay function touch area includes at least one of the following touch sub-areas: a rotation touch sub-area used for responding to the rotation operation on the to-be-edited image; and a perspective touch sub-area used for responding to the perspective operation on the to-be-edited image. Apparently, in practice, a setting method, a setting form and the number of touch keys (that is, virtual keys) in the touch area (for example, the first overlay function touch area and the scale touch area) may be set arbitrarily according to actual needs, which is not limited in the embodiment of the present disclosure. For example, multiple keys for different scales may be set in the scale touch area for the user to select, and the first overlay function touch area may be provided with a rotary slider as a rotation touch sub-area for the user to select a rotation angle within a preset angle, etc.

Figure 3:
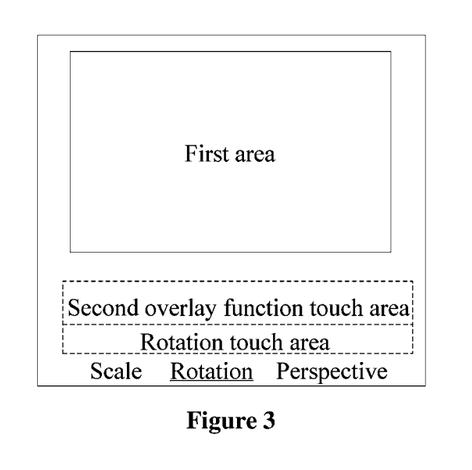
FIG. 3 is a schematic diagram of a second interface in a specific example of an image processing component according to an embodiment of the present disclosure.

The image rotation control is configured to display, in response to a second control instruction, an image rotation adjustment interface on an area in the display area other than the first area, and at least display a rotation touch area and a second overlay function touch area in the image rotation adjustment interface, where the rotation touch area is used for responding to the rotation operation on the to-be-edited image, and the second overlay function touch area is used for responding to an adjustment operation (such as a scale adjustment operation and/or a perspective operation) on the to-be-edited image other than the rotation operation. For example, as shown in FIG. 3, when an electronic device, such as a mobile phone, starts the image processing program and enters an editing interface, the electronic device may be triggered to enter the image rotation adjustment interface based on the second control instruction, that is, the image rotation adjustment interface is displayed on an area in the display area other than the first area. Here, the electronic device may generate a second control instruction after detecting the touch operation performed on the "rotation" virtual key to trigger the electronic device to display the image rotation adjustment interface on an area in the display area other than the first area.

The image rotation adjustment interface includes a rotation touch area and a second overlay function touch area. In a specific example, the second overlay function touch area includes at least one of the following touch sub-areas: a scale touch sub-area used for responding to the scale adjustment operation on the to-be-edited image; and a perspective touch sub-area used for responding to the perspective operation on the to-be-edited image. Apparently, in practice, a setting method, a setting form and the number of touch keys (that is, virtual keys) in the touch area (for example, the second overlay function touch area and the rotation touch area) may be set arbitrarily according to actual needs, which is not limited in the embodiment of the present disclosure. For example, the rotation touch area may be provided with a rotary slider for the user to select a rotation angle within a preset angle, etc. Multiple keys for different scales may be set in the second overlay function touch area for the user to select.

In a specific embodiment, the image processing component further displays at least an image perspective control on the display area after the electronic device starts the image processing program.

Figure 4:
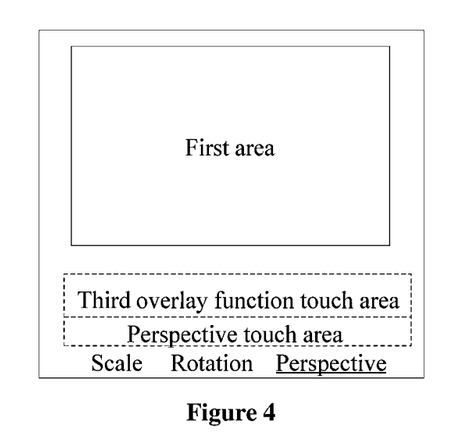
FIG. 4 is a schematic diagram of a third interface in a specific example of an image processing component according to an embodiment of the present disclosure.

The image perspective control is configured to display, in response to a third control instruction, an image perspective adjustment interface on an area in the display area other than the first area, and at least display a perspective touch area and a third overlay function touch area in the image perspective adjustment interface. The perspective touch area is used for responding to a perspective operation on the to-be-edited image, and the third overlay function touch area is used for responding to an adjustment operation (such as a scale adjustment operation) on the to-be-edited image other than the perspective operation. For example, as shown in FIG. 4, the display area may also display a "perspective" virtual key for the image perspective control. When an electronic device, such as a mobile phone, starts the image processing program and enters an editing interface, the electronic device may be triggered to enter the image perspective adjustment interface based on the third control instruction, that is, the image perspective adjustment interface is displayed on an area in the display area other than the first area. Here, the electronic device may generate a third control instruction after detecting the touch operation performed on the "perspective" virtual key to trigger the electronic device to display the image perspective adjustment interface on an area in the display area other than the first area.

The image perspective adjustment interface includes a perspective touch area and a third overlay function touch area. In a specific example, the third overlay function touch area at least includes a scale touch sub-area used for responding to the scale adjustment operation on the to-be-edited image. Apparently, in practice, a setting method, a setting form and the number of touch keys (that is, virtual keys) in the touch area (for example, the third overlay function touch area and the perspective touch area) may be set arbitrarily according to actual needs, which is not limited in the embodiment of the present disclosure.

For example, the perspective touch area includes: a first sub-area used for performing the perspective operation on the to-be-edited image in a preset first direction, in response to a second touch operation on the first sub-area and based on a second operation feature of the second touch operation in the preset first direction; and/or a second sub-area used for performing the perspective operation on the to-be-edited image in a preset second direction, in response to a third touch operation on the second sub-area and based on a third operation feature of the third touch operation in the preset second direction. Here, the preset first direction may be the X-axis direction, and the preset second direction may be the Y-axis direction. Correspondingly, the first sub-area and the second sub-area may be implemented by different sliding rods. In this case, a perspective manner may be determined by sliding the sliding rod corresponding to the X axis or the sliding rod corresponding to the Y axis. For example, for the perspective in the X axis direction, when sliding the sliding rod to the right, the left side of the to-be-edited image remains unchanged, the right side of the to-be-edited image becomes larger, and on the contrary, when sliding the sliding rod to the left, the right side of the to-be-edited image remains unchanged, the left side of the to-be-edited image becomes larger. Here, rules such as the speed and scale of image enlargement may be controlled according to the effect requirements, which are not limited in this embodiment of the present disclosure.

Here, in practice, the perspective touch area may be provided with only the first sub-area, in this case, the perspective processing can be implemented in the preset first direction. Similarly, the perspective touch area may be provided with only the second sub-area, in this case, the perspective processing can be implemented in the preset second direction. Apparently, in order to achieve more functions, the perspective touch area may be provided with both the first sub-area and the second sub-area, in this case, the perspective processing can be implemented in both the preset first direction and the preset second direction.

Here, it should be noted that, in practice, if the first overlay function touch area is provided with a rotation sub-area, in this case, the functions that can be realized by the function keys in the rotation sub-area may be the same as or may be different from the functions that can be realized by the function keys in the rotation touch area of image rotation adjustment interface. For example, the function keys of the rotation sub-area in the first overlay function touch area only have some functions of the function keys in the rotation touch area of the image rotation adjustment interface. The second overlay function touch area and the third overlay function touch area are similar to the first overlay function touch area, and may only implement part of the functions that can be realized by other specific controls. That is, in practice, the overlay function touch area may only implement part of the functions that can be realized by other specific controls. For example, only the functions of other controls with high operation frequency are added to the overlay function touch area, so as to minimize the cumbersome operations. In addition, the functions of the specific control are more refined, therefore it also provides further possibilities for refined retouching, which in turn lays the foundation for meeting the different needs of different users.

In a specific embodiment, the display control is further configured to display a cropping frame used for responding to a cropping operation on the to-be-edited image, crop the to-be-edited image in response to the cropping operation for the cropping frame, and at least display a target image obtained after cropping the to-be-edited image in the cropping frame. That is, in a specific example, the display control also has a cropping function, and the cropping frame is used to crop the to-be-edited image. Here, the cropping frame is displayed on the first area in the display area, it is not related to the interface displayed in other areas other than the first area. In other words, no matter which of the image rotation adjustment interface, the image scale adjustment interface and the image perspective adjustment interface is displayed on the area other than the first area, the clipping frame can be displayed on the first area. Therefore, the image scale adjustment control, the image rotation control and the image perspective control may also use the clipping frame of the display control to realize the clipping function, which further enriches the user experience.

In another specific embodiment, the display control is further configured to, in response to a first touch operation on the first area and after determining that a first operation feature of the first touch operation meets a preset rule, perform a perspective operation on the to-be-edited image or the target image currently displayed on the first area based on the first operation feature, and display a target image obtained after the perspective operation on the first area. For example, a gesture, such as single-finger touch is defined, in this case, if it is detected that the first operation feature of the first touch operation meets the feature of the single-finger touch, it may be considered that the first operation feature of the first touch operation meets the preset rule. At this time, the perspective manner may be determined according to the first operation feature (such as the area of the touch point in the to-be-edited image, the touch angle and sliding track) of the first touch operation, and then the perspective operation is performed on the to-be-edited image, and the target image obtained after the perspective operation is displayed on the first area.

Apparently, in practice, the perspective manner may also be determined according to the sliding trajectory of the first touch operation in the preset direction. Specifically, the display control is further configured to obtain an operation feature (such as angle and displacement) of the first touch operation in a preset first direction and/or a preset second direction, and perform a perspective operation on the to-be-edited image or the target image currently displayed in the first area based on the operation feature of the first touch operation in the preset first direction and/or the preset second direction.

Here, the display control can perform the perspective operation on the to-be-edited image or the target image in response to the first touch operation having the operation feature meeting the preset rule, therefore, a specific gesture perspective operation can be realized by using the display control no matter in the image scale adjustment interface, or the image rotation adjustment interface or the image perspective adjustment interface, so that the image scale adjustment control, the image rotation control and the image perspective control have the gesture perspective function without the need for interface switching, which further avoids cumbersome operations, and lays a foundation for improving composition efficiency and user experience.

Here, the image scale adjustment interface corresponding to the image scale adjustment control is provided with the scale touch area matching the image scale adjustment control and the first overlay function touch area for responding to another adjustment operation, the image rotation adjustment interface corresponding to the image rotation control is provided with the rotation touch area matching the image rotation control and the second overlay function touch area for responding to another adjustment operation, that is, the image scale adjustment control and the image rotation control used for the composition operation in the embodiment of the present disclosure not only have their respective corresponding control functions, but also have other functions. In this way, it is possible for the user to realize multiple composition functions in one interface, and avoid cumbersome operations such as the user switching back and forth between multiple functional interfaces in one composition to the greatest extent, which lays a foundation for improving composition efficiency and user experience.

Furthermore, the image processing component further displays the image perspective control on the display area after the electronic device starts the image processing program, therefore, user composition tools are enriched and the foundation is laid for improving the user experience. Moreover, the image perspective adjustment interface corresponding to the image perspective control is provided with the perspective touch area matching the image perspective control and the third overlay function touch area used for responding to another adjustment operation, that is, the image perspective control used for the composition operation in the embodiment of the present disclosure not only has the perspective function, but also has other functions, which further avoids cumbersome operations, and lays a foundation for improving composition efficiency and user experience.

In addition, the display control is provided with the cropping frame used for responding to the cropping operation on the to-be-edited image, therefore, the cropping frame can be displayed by using the display control no matter in the image scale adjustment interface or the image rotation adjustment interface or the image perspective adjustment interface, and further, the image scale adjustment control, the image rotation control and the image perspective control have the cropping function without the need for interface switching, which further avoids cumbersome operations, and lays a foundation for improving composition efficiency and user experience.

An electronic device is provided according to an embodiment of the present disclosure. The electronic device at least includes: a storage component for storing an image; and an image processing component connected to the storage component. The image processing component is the above-mentioned image processing component.

Figure 5:
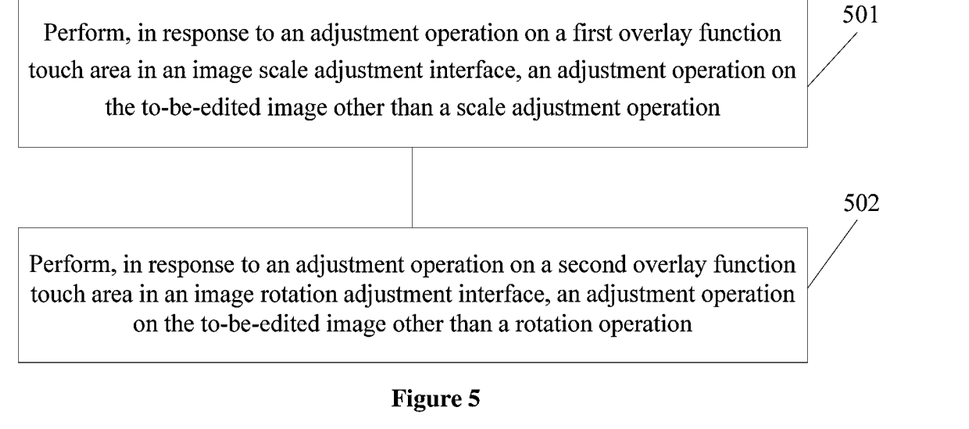
FIG. 5 is a schematic diagram of an implementation flowchart of an image processing method according to an embodiment of the present disclosure.

An image processing method is provided according to the embodiment of the disclosure. A first area in a display area of an electronic device displays a to-be-edited image or displays a target image obtained after performing an adjustment operation on the to-be-edited image. The adjustment operation includes at least a scale adjustment operation and a rotation operation. For example, as shown in FIG. 2, when an electronic device, such as a mobile phone, starts the image processing program and enters an editing interface, at this time, the display control displays the to-be-edited image on the first area in the display area. The target image obtained after the adjustment operation on the to-be-edited image can also be displayed in real time on the first area, so that it is convenient for the user to view the real-time adjustment effect. Specifically, as shown in FIG. 5, the method includes step 501 and/or step 502.

Step 501: perform, in response to an adjustment operation on a first overlay function touch area in an image scale adjustment interface, an adjustment operation on the to-be-edited image other than a scale adjustment operation, where the image scale adjustment interface is displayed on an area in the display area other than the first area, and the image scale adjustment interface at least displays a scale touch area and a first overlay function touch area, where the scale touch area is used for responding to a scale adjustment operation on the to-be-edited image, and the first overlay function touch area is used for responding to an adjustment operation on the to-be-edited image other than the scale adjustment operation.

Step 502: perform, in response to an adjustment operation on a second overlay function touch area in an image rotation adjustment interface, an adjustment operation on the to-be-edited image other than a rotation operation, where the image rotation adjustment interface is displayed on an area in the display area other than the first area, and the image rotation adjustment interface at least displays a rotation touch area and a second overlay function touch area, where the rotation touch area is used for responding to a rotation operation on the to-be-edited image, and the second overlay function touch area is used for responding to an adjustment operation on the to-be-edited image other than the rotation operation.

Here, it should be noted that, in practice, the execution order between step 501 and step 502 is not limited, and step 501 and step 502 may be understood as co-existing. That is, in a specific scenario, only step 501 may be executed. In another scenario, only step 502 may be executed. Apparently, there is also a scenario where both steps 501 and 502 may be executed, and the execution order of the two steps is not limited, that is, step 501 is executed firstly and then step 502 is executed; or step 502 is executed firstly and then step 501 is executed. The execution order is related to the user's operation habit or composition habit, which is not limited in this disclosure.

In one embodiment, the method further includes: cropping the to-be-edited image in response to a cropping operation for a cropping frame; at least displaying a target image obtained after cropping the to-be-edited image in the cropping frame. The cropping frame is displayed on the first area and surrounds at least a part of the area of the to-be-edited image, to crop the to-be-edited image based on change in the area enclosed by the cropping frame. For example, in practice, the cropping frame may frame entire image content of the to-be-edited image or the target image, in this way, the user can realize cropping of the to-be-edited image or the target image by scaling the area enclosed by the cropping frame.

In one embodiment, the method further includes: in response to a first touch operation on the first area and after determining that a first operation feature of the first touch operation meets a preset rule, performing a perspective operation on the to-be-edited image or the target image currently displayed on the first area based on the first operation feature, and displaying a target image obtained after the perspective operation on the first area.

In one embodiment, the performing a perspective operation on the to-be-edited image or the target image currently displayed on the first area based on the first operation feature includes: obtaining an operation feature of the first touch operation in a preset first direction and/or a preset second direction, and performing a perspective operation on the to-be-edited image or the target image currently displayed in the first area based on the operation feature of the first touch operation in the preset first direction and/or the preset second direction.

In one embodiment, the method further includes: performing, in response to an adjustment operation on a third overlay function touch area in an image perspective adjustment interface, an adjustment operation on the to-be-edited image other than a perspective operation, where the image perspective adjustment interface is displayed on an area in the display area other than the first area, and the image perspective adjustment interface at least displays a perspective touch area and a third overlay function touch area, where the perspective touch area is used for responding to a perspective operation on the to-be-edited image, and the third overlay function touch area is used for responding to an adjustment operation on the to-be-edited image other than the perspective operation.

In one embodiment, the method further includes: performing the perspective operation on the to-be-edited image in a preset first direction, in response to a second touch operation on a first sub-area in the perspective touch area and based on a second operation feature of the second touch operation in the preset first direction; and/or performing the perspective operation on the to-be-edited image in a preset second direction, in response to a third touch operation on a second sub-area in the perspective touch area and based on a third operation feature of the third touch operation in the preset second direction.

In one embodiment, the third overlay function touch area at least includes a scale touch sub-area used for responding to the scale adjustment operation on the to-be-edited image. In this case, the method further includes: performing the scale adjustment operation on the to-be-edited image, in response to an adjustment operation on a scale touch sub-area at least included in the third overlay function touch area.

In one embodiment, the first overlay function touch area includes at least one of the following touch sub-areas: a rotation touch sub-area used for responding to the rotation operation on the to-be-edited image; and a perspective touch sub-area used for responding to the perspective operation on the to-be-edited image. In this case, the method further includes: performing the rotation operation on the to-be-edited image, in response to an adjustment operation on a rotation touch sub-area at least included in the first overlay function touch area; and/or performing a perspective operation on the to-be-edited image, in response to an adjustment operation on a perspective touch sub-area at least included in the first overlay function touch area.

In one embodiment, the second overlay function touch area includes at least one of the following touch sub-areas: a scale touch sub-area used for responding to the scale adjustment operation on the to-be-edited image; and a perspective touch sub-area used for responding to the perspective operation on the to-be-edited image. In this case, the method further includes: performing the scale adjustment operation on the to-be-edited image, in response to an adjustment operation on a scale touch sub-area at least included in the second overlay function touch area; and/or performing a perspective operation on the to-be-edited image, in response to an adjustment operation on a perspective touch sub-area at least included in the second overlay function touch area.

It should be pointed out here that the descriptions of the above method embodiments are similar to the descriptions of the above image processing component, and the above method embodiments have the same beneficial effects as those of the image processing component embodiments, which will not be repeated. For the technical details not disclosed in the embodiments of the electronic device of the present disclosure, those skilled in the art should refer to the description of the embodiments of the image processing component of the present disclosure, and in order to save space, they will not be repeated here.

Figure 6:
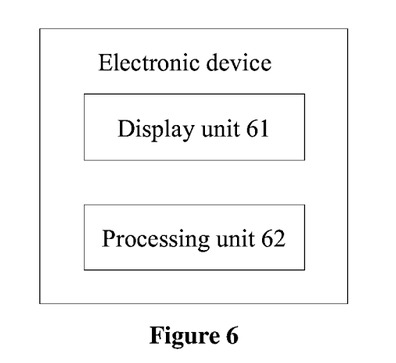
FIG. 6 is a schematic structural diagram of logic units of an electronic device according to an embodiment of the present disclosure.

An electronic device is provided according to an embodiment of the disclosure. As shown in FIG. 6, the electronic device includes a display unit 61 and a processing unit 62.

The display unit 61 is configured to display a to-be-edited image on a first area in the display area or display a target image obtained after performing an adjustment operation on the to-be-edited image.

The processing unit 62 is configured to: perform, in response to an adjustment operation on a first overlay function touch area in an image scale adjustment interface, an adjustment operation on the to-be-edited image other than a scale adjustment operation, where the image scale adjustment interface is displayed on an area in the display area other than the first area, and the image scale adjustment interface at least displays a scale touch area and a first overlay function touch area, where the scale touch area is used for responding to a scale adjustment operation on the to-be-edited image, and the first overlay function touch area is used for responding to an adjustment operation on the to-be-edited image other than the scale adjustment operation; and/or perform, in response to an adjustment operation on a second overlay function touch area in an image rotation adjustment interface, an adjustment operation on the to-be-edited image other than a rotation operation, where the image rotation adjustment interface is displayed on an area in the display area other than the first area, and the image rotation adjustment interface at least displays a rotation touch area and a second overlay function touch area, where the rotation touch area is used for responding to a rotation operation on the to-be-edited image, and the second overlay function touch area is used for responding to an adjustment operation on the to-be-edited image other than the rotation operation.

In one embodiment, the processing unit 62 is further configured to: crop the to-be-edited image in response to a cropping operation for a cropping frame; at least display a target image obtained after cropping the to-be-edited image in the cropping frame. The cropping frame is displayed on the first area and surrounds at least a part of the area of the to-be-edited image, to crop the to-be-edited image based on change in the area enclosed by the cropping frame.

In one embodiment, the processing unit 62 is further configured to: in response to a first touch operation on the first area and after determining that a first operation feature of the first touch operation meets a preset rule, perform a perspective operation on the to-be-edited image or the target image currently displayed on the first area based on the first operation feature, and display a target image obtained after the perspective operation on the first area.

In one embodiment, the processing unit 62 is further configured to: obtain an operation feature of the first touch operation in a preset first direction and/or a preset second direction, and perform a perspective operation on the to-be-edited image or the target image currently displayed in the first area based on the operation feature of the first touch operation in the preset first direction and/or the preset second direction.

In one embodiment, the processing unit 62 is further configured to: perform, in response to an adjustment operation on a third overlay function touch area in an image perspective adjustment interface, an adjustment operation on the to-be-edited image other than a perspective operation, where the image perspective adjustment interface is displayed on an area in the display area other than the first area, and the image perspective adjustment interface at least displays a perspective touch area and a third overlay function touch area, where the perspective touch area is used for responding to a perspective operation on the to-be-edited image, and the third overlay function touch area is used for responding to an adjustment operation on the to-be-edited image other than the perspective operation.

In one embodiment, the processing unit 62 is further configured to: perform the perspective operation on the to-be-edited image in a preset first direction, in response to a second touch operation on a first sub-area in the perspective touch area and based on a second operation feature of the second touch operation in the preset first direction; and/or perform the perspective operation on the to-be-edited image in a preset second direction, in response to a third touch operation on a second sub-area in the perspective touch area and based on a third operation feature of the third touch operation in the preset second direction.

In one embodiment, the processing unit 62 is further configured to: perform the scale adjustment operation on the to-be-edited image, in response to an adjustment operation on a scale touch sub-area at least included in the third overlay function touch area.

In one embodiment, the processing unit 62 is further configured to: perform the rotation operation on the to-be-edited image, in response to an adjustment operation on a rotation touch sub-area at least included in the first overlay function touch area; and/or perform a perspective operation on the to-be-edited image, in response to an adjustment operation on a perspective touch sub-area at least included in the first overlay function touch area.

In one embodiment, the processing unit 62 is further configured to: perform the scale adjustment operation on the to-be-edited image, in response to an adjustment operation on a scale touch sub-area at least included in the second overlay function touch area; and/or perform a perspective operation on the to-be-edited image, in response to an adjustment operation on a perspective touch sub-area at least included in the second overlay function touch area.

It should be pointed out here that the descriptions of the above electronic device embodiments are similar to the descriptions of the above method, and the above electronic device embodiments have the same beneficial effects as those of the method embodiments, which will not be repeated. For the technical details not disclosed in the embodiments of the electronic device of the present disclosure, those skilled in the art should refer to the description of the method embodiments of the present disclosure, and in order to save space, they will not be repeated here.

An electronic device is provided according to the disclosure. The electronic device includes one or more processors, a memory communicatively connected to the one or more processors; and one or more programs. The one or more programs are stored in the memory and are configured to be executed by the one or more processors, to perform the above method.

Figure 7:
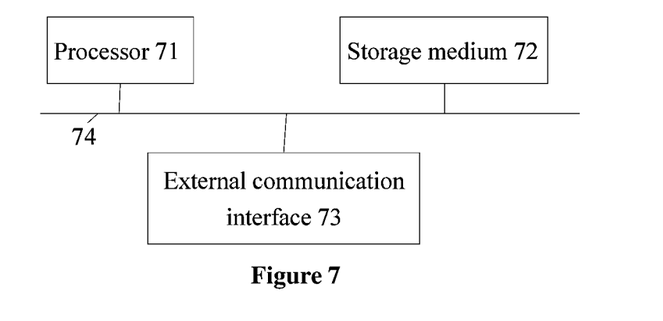
FIG. 7 is a schematic diagram of a hardware structure of an electronic device according to an embodiment of the present disclosure.

In a specific example, the electronic device described in this embodiment of the present disclosure may specifically have a structured as shown in FIG. 7, and the electronic device includes at least a processor 71, a storage medium 72 and at least one external communication interface 73. The processor 71, the storage medium 72 and the external communication interface 73 are all connected through the bus 74. The processor 71 may be an electronic component with processing functions, such as a microprocessor, a central processing unit, a digital signal processor, or a programmable logic array. Computer-executable codes are stored in the storage medium, and the computer-executable codes can execute the method described in any of the above embodiments. In practice, the display unit 61 and the processing unit 62 may be implemented by the processor 71. Alternatively, the display control, the image scale adjustment control, the image rotation control, and the image perspective control may all be implemented by the processor 71.

A computer-readable storage medium is provided according to an embodiment of the disclosure. The computer-readable storage medium stores a computer program. The computer program, when executed by a processor, performs the above method.

Here, a computer-readable storage medium may be any apparatus that can contain, store, communicate, propagate, or transport the program for use by or in connection with the instruction execution system, apparatus, or apparatus. More specific examples (non-exhaustive list) of computer readable storage media include the following: electrical connections with one or more wiring (electronic devices), portable computer disk cartridges (magnetic devices), Random Access Memory (RAM), Read Only Memory (ROM), Erasable Editable Read Only Memory (EPROM or Flash Memory), Fiber Optic Devices, and Portable Read Only Memory (CDROM). In addition, the computer-readable storage medium may even be paper or other suitable medium on which the program can be printed, as it is possible, for example, by optically scanning the paper or other medium, followed by editing, interpreting or, if necessary, other process in a suitable manner to obtain the program electronically and then store it in computer memory.

It should be understood that those of ordinary skill in the art can understand that all or part of the steps carried by the method in the above-mentioned embodiments may be completed by instructing the relevant hardware through a program, and the program may be stored in a computer-readable storage medium. When the program is executed, it includes one or a combination of the steps of the method embodiment.

In addition, each functional component in each embodiment of the present disclosure may be integrated into one processing module, or each component may exist physically alone, or two or more components may be integrated into one module. The above-mentioned integrated modules may be implemented in the form of hardware, and may also be implemented in the form of software function modules. If the integrated modules are implemented in the form of software functional modules and sold or used as independent products, they may also be stored in a computer-readable storage medium. The storage medium may be a read-only memory, a magnetic disk or an optical disk, and the like.

The above-described embodiments are only some of the embodiments of the present disclosure, but not all of the embodiments. Based on the embodiments of the present disclosure, all other embodiments obtained by those skilled in the art without creative efforts shall fall within the protection scope of the present disclosure.

The invention claimed is:

1. An image processing method, a first area in a display of an electronic device displaying a to-be-edited image or displaying a target image obtained after performing an adjustment operation on the to-be-edited image, the method comprises:

performing, in response to an adjustment operation on a first overlay function touch area in an image scale adjustment interface, a rotation operation and/or a perspective operation on the to-be-edited image, wherein the image scale adjustment interface is displayed on an area in the display other than the first area in response to a first control instruction by a user for triggering entering the image scale adjustment interface, and the image scale adjustment interface at least displays a scale touch area and a first overlay function touch area, wherein the scale touch area is used for responding to a scale adjustment operation on the to-be-edited image, and the first overlay function touch area is used for responding to a rotation operation and/or a perspective operation on the to-be-edited image; and/or performing, in response to an adjustment operation on a second overlay function touch area in an image rotation adjustment interface, a scale adjustment operation and/or a perspective operation on the to-be-edited image, wherein the image rotation adjustment interface is displayed on an area in the display other than the first area in response to a second control instruction by the user for triggering entering the image rotation adjustment interface that previously displayed the first overlay function touch area, and the image rotation adjustment interface at least displays a rotation touch area and a second overlay function touch area, wherein the rotation touch area is used for responding to a rotation operation on the to-be-edited image, and the second overlay function touch area is used for responding to a scale adjustment operation and/or a perspective operation on the to-be-edited image, wherein the first overlay function touch area includes at least one of the following touch sub-areas: a rotation touch sub-area used for responding to the rotation operation on the to-be-edited image; and a perspective touch sub-area used for responding to the perspective operation on the to-be-edited image, and wherein the second overlay function touch area includes at least one of the following touch sub-areas: a scale touch sub-area used for responding to the scale adjustment operation on the to-be-edited image; and a perspective touch sub-area used for responding to the perspective operation on the to-be-edited image;

perform, in response to an adjustment operation on a third overlay function touch area in an image perspective adjustment interface, an adjustment operation on the to-be-edited image other than a perspective operation, wherein the image perspective adjustment interface is displayed on an area in the display other than the first area in response to a third control instruction by the user for triggering entering the image perspective adjustment interface that previously displayed the first or second overlay function touch area, and the image perspective adjustment interface at least displays a perspective touch area and a third overlay function touch area, wherein the perspective touch area is used for responding to a perspective operation on the to-be-edited image, and the third overlay function touch area is used for responding to an adjustment operation on the to-be-edited image other than the perspective operation, wherein the first, second, and third control instructions are performed by touching a scale virtual key, a rotation virtual key, and a perspective virtual, respectively, that are displayed along with the first area.

2. The image processing method according to claim 1, further comprising:

in response to a first touch operation on the first area and after determining that a first operation feature of the first touch operation meets a preset rule, performing a perspective operation on the to-be-edited image or the target image currently displayed on the first area based on the first operation feature, and displaying a target image obtained after the perspective operation on the first area.

3. The image processing method according to claim 1, further comprising:

performing, in response to an adjustment operation on a third overlay function touch area in an image perspective adjustment interface, an adjustment operation on the to-be-edited image other than a perspective operation, wherein the image perspective adjustment interface is displayed on an area in the display other than the first area, and the image perspective adjustment interface at least displays a perspective touch area and a third overlay function touch area, wherein the perspective touch area is used for responding to a perspective operation on the to-be-edited image, and the third overlay function touch area is used for responding to an adjustment operation on the to-be-edited image other than the perspective operation.

4. The image processing method according to claim 2, further comprising:

performing, in response to an adjustment operation on a third overlay function touch area in an image perspective adjustment interface, an adjustment operation on the to-be-edited image other than a perspective operation, wherein the image perspective adjustment interface is displayed on an area in the display other than the first area, and the image perspective adjustment interface at least displays a perspective touch area and a third overlay function touch area, wherein the perspective touch area is used for responding to a perspective operation on the to-be-edited image, and the third overlay function touch area is used for responding to an adjustment operation on the to-be-edited image other than the perspective operation.

5. The image processing method according to claim 3, further comprising:

performing the perspective operation on the to-be-edited image in a preset first direction, in response to a second touch operation on a first sub-area in the perspective touch area and based on a second operation feature of the second touch operation in the preset first direction; and/or performing the perspective operation on the to-be-edited image in a preset second direction, in response to a third touch operation on a second sub-area in the perspective touch area and based on a third operation feature of the third touch operation in the preset second direction; or wherein the method further comprises:

performing the scale adjustment operation on the to-be-edited image, in response to an adjustment operation on a scale touch sub-area comprised in the third overlay function touch area.

6. The image processing method according to claim 1, further comprising:

performing the rotation operation on the to-be-edited image, in response to an adjustment operation on a rotation touch sub-area comprised in the first overlay function touch area; and/or performing a perspective operation on the to-be-edited image, in response to an adjustment operation on a perspective touch sub-area comprised in the first overlay function touch area.

7. The image processing method according to claim 1, further comprising:

performing the scale adjustment operation on the to-be-edited image, in response to an adjustment operation on a scale touch sub-area comprised in the second overlay function touch area; and/or performing a perspective operation on the to-be-edited image, in response to an adjustment operation on a perspective touch sub-area comprised in the second overlay function touch area.

8. An electronic device comprising:

a display;

at least one processor; and at least one memory communicatively coupled to the at least one processor and storing instructions that upon execution by the at least one processor cause the device to:

display a to-be-edited image on a first area in a display or display a target image obtained after performing an adjustment operation on the to-be-edited image on the first area, wherein the adjustment operation comprises at least a scale adjustment operation and a rotation operation;

performing, in response to an adjustment operation on a first overlay function touch area in an image scale adjustment interface, a rotation operation and/or a perspective operation on the to-be-edited image, wherein the image scale adjustment interface is displayed on an area in the display other than the first area, and the image scale adjustment interface at least displays a scale touch area and a first overlay function touch area in response to a first control instruction by a user for triggering entering the image scale adjustment interface, wherein the scale touch area is used for responding to a scale adjustment operation on the to-be-edited image, and the first overlay function touch area is used for responding to a rotation operation and/or a perspective operation on the to-be-edited image; and/or perform, in response to an adjustment operation on a second overlay function touch area in an image rotation adjustment interface, a scale adjustment operation and/or a perspective operation on the to-be-edited image, wherein the image rotation adjustment interface is displayed on an area in the display other than the first area in response to a second control instruction by the user for triggering entering the image rotation adjustment interface that previously displayed the first overlay function touch area, and the image rotation adjustment interface at least displays a rotation touch area and a second overlay function touch area, wherein the rotation touch area is used for responding to a rotation operation on the to-be-edited image, and the second overlay function touch area is used for responding to a scale adjustment operation and/or a perspective operation on the to-be-edited image, wherein the first overlay function touch area includes at least one of the following touch sub-areas: a rotation touch sub-area used for responding to the rotation operation on the to-be-edited image; and a perspective touch sub-area used for responding to the perspective operation on the to-be-edited image, and wherein the second overlay function touch area includes at least one of the following touch sub-areas: a scale touch sub-area used for responding to the scale adjustment operation on the to-be-edited image; and a perspective touch sub-area used for responding to the perspective operation on the to-be-edited image;

perform, in response to an adjustment operation on a third overlay function touch area in an image perspective adjustment interface, an adjustment operation on the to-be-edited image other than a perspective operation, wherein the image perspective adjustment interface is displayed on an area in the display other than the first area in response to a third control instruction by the user for triggering entering the image perspective adjustment interface that previously displayed the first or second overlay function touch area, and the image perspective adjustment interface at least displays a perspective touch area and a third overlay function touch area, wherein the perspective touch area is used for responding to a perspective operation on the to-be-edited image, and the third overlay function touch area is used for responding to an adjustment operation on the to-be-edited image other than the perspective operation, wherein the first, second, and third control instructions are performed by touching a scale virtual key, a rotation virtual key, and a perspective virtual, respectively, that are displayed along with the first area.

9. The electronic device according to claim 8, wherein the one or more programs are stored in the memory and are configured to be executed by the one or more processors cause the electronic device to:

in response to a first touch operation on the first area and after determining that a first operation feature of the first touch operation meets a preset rule, perform a perspective operation on the to-be-edited image or the target image currently displayed on the first area based on the first operation feature, and display a target image obtained after the perspective operation on the first area.

10. The electronic device according to claim 8, wherein the one or more programs are stored in the memory and are configured to be executed by the one or more processors cause the electronic device to:

perform the perspective operation on the to-be-edited image in a preset first direction, in response to a second touch operation on a first sub-area in the perspective touch area and based on a second operation feature of the second touch operation in the preset first direction; and/or perform the perspective operation on the to-be-edited image in a preset second direction, in response to a third touch operation on a second sub-area in the perspective touch area and based on a third operation feature of the third touch operation in the preset second direction; or perform the scale adjustment operation on the to-be-edited image, in response to an adjustment operation on a scale touch sub-area comprised in the third overlay function touch area.

11. The electronic device according to claim 8, wherein the one or more programs are stored in the memory and are configured to be executed by the one or more processors cause the electronic device to:

perform the rotation operation on the to-be-edited image, in response to an adjustment operation on a rotation touch sub-area comprised in the first overlay function touch area; and/or perform a perspective operation on the to-be-edited image, in response to an adjustment operation on a perspective touch sub-area comprised in the first overlay function touch area.

12. The electronic device according to claim 8, wherein the one or more programs are stored in the memory and are configured to be executed by the one or more processors cause the electronic device to:

perform the scale adjustment operation on the to-be-edited image, in response to an adjustment operation on a scale touch sub-area comprised in the second overlay function touch area; and/or perform a perspective operation on the to-be-edited image, in response to an adjustment operation on a perspective touch sub-area comprised in the second overlay function touch area.

13. A computer-readable non-transitory storage medium storing a non-transitory computer program, the non-transitory computer program, when executed by a computer, cause the computer to:

display a to-be-edited image on a first area in a display or display a target image obtained after performing an adjustment operation on the to-be-edited image on the first area, wherein the adjustment operation comprises at least a scale adjustment operation and a rotation operation;

perform, in response to an adjustment operation on a first overlay function touch area in an image scale adjustment interface, a rotation operation and/or a perspective operation on the to-be-edited image, wherein the image scale adjustment interface is displayed on an area in the display other than the first area in response to a first control instruction by a user for triggering entering the image scale adjustment interface, and the image scale adjustment interface at least displays a scale touch area and a first overlay function touch area, wherein the scale touch area is used for responding to a scale adjustment operation on the to-be-edited image, and the first overlay function touch area is used for responding to a rotation operation and/or a perspective operation on the to-be-edited image; and/or perform, in response to an adjustment operation on a second overlay function touch area in an image rotation adjustment interface, a scale adjustment operation and/or a perspective operation on the to-be-edited image, wherein the image rotation adjustment interface is displayed on an area in the display other than the first area in response to a second control instruction by the user for triggering entering the image rotation adjustment interface that previously displayed the first overlay function touch area, and the image rotation adjustment interface at least displays a rotation touch area and a second overlay function touch area, wherein the rotation touch area is used for responding to a rotation operation on the to-be-edited image, and the second overlay function touch area is used for responding to a scale adjustment operation and/or a perspective operation on the to-be-edited image, wherein the first overlay function touch area includes at least one of the following touch sub-areas: a rotation touch sub-area used for responding to the rotation operation on the to-be-edited image; and a perspective touch sub-area used for responding to the perspective operation on the to-be-edited image, and wherein the second overlay function touch area includes at least one of the following touch sub-areas: a scale touch sub-area used for responding to the scale adjustment operation on the to-be-edited image; and a perspective touch sub-area used for responding to the perspective operation on the to-be-edited image;

perform, in response to an adjustment operation on a third overlay function touch area in an image perspective adjustment interface, an adjustment operation on the to-be-edited image other than a perspective operation, wherein the image perspective adjustment interface is displayed on an area in the display other than the first area in response to a third control instruction by the user for triggering entering the image perspective adjustment interface that previously displayed the first or second overlay function touch area, and the image perspective adjustment interface at least displays a perspective touch area and a third overlay function touch area, wherein the perspective touch area is used for responding to a perspective operation on the to-be-edited image, and the third overlay function touch area is used for responding to an adjustment operation on the to-be-edited image other than the perspective operation, wherein the first, second, and third control instructions are performed by touching a scale virtual key, a rotation virtual key, and a perspective virtual, respectively, that are displayed along with the first area.

14. The computer-readable non-transitory storage medium according to claim 13, wherein the display control is further configured to, in response to a first touch operation on the first area and after determining that a first operation feature of the first touch operation meets a preset rule, perform a perspective operation on the to-be-edited image or the target image currently displayed on the first area based on the first operation feature, and display a target image obtained after the perspective operation on the first area.

15. The computer-readable non-transitory storage medium according to claim 13, wherein the perspective touch area comprises:

a first sub-area used for performing the perspective operation on the to-be-edited image in a preset first direction, in response to a second touch operation on the first sub-area and based on a second operation feature of the second touch operation in the preset first direction; and/or a second sub-area used for performing the perspective operation on the to-be-edited image in a preset second direction, in response to a third touch operation on the second sub-area and based on a third operation feature of the third touch operation in the preset second direction.

* * * * *